US012809283B2

(12) United States Patent
Yoshimasa et al.

(10) Patent No.: US 12,809,283 B2
(45) Date of Patent: Nov. 24, 2026

(54) TONER AND IMAGE READING METHOD

(71) Applicant: CANON KABUSHIKI KAISHA, Tokyo (JP)

(72) Inventors: Yutaka Yoshimasa, Kanagawa (JP); Takeshi Yamamoto, Kanagawa (JP); Satoshi Yamabi, Kanagawa (JP); Yoshihiro Ohashi, Tokyo (JP); Hiroshi Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 456 days.

(21) Appl. No.: 18/358,783

(22) Filed: Jul. 25, 2023

(65) Prior Publication Data

US 2023/0384703 A1 Nov. 30, 2023

Related U.S. Application Data

(63) Continuation of application No. PCT/JP2022/002904, filed on Jan. 26, 2022.

(30) Foreign Application Priority Data

Jan. 29, 2021 (JP) ................................ 2021-012778
Sep. 16, 2021 (JP) ................................ 2021-151226

(51) Int. Cl.
*G03G 9/097* (2006.01)
*G03G 9/08* (2006.01)
(Continued)

(52) U.S. Cl.
CPC ....... *G03G 9/09708* (2013.01); *G03G 9/0819* (2013.01); *G03G 9/0827* (2013.01);
(Continued)

(58) Field of Classification Search
CPC ............ G03G 9/09708; G03G 9/0819; G03G 9/0827; G03G 9/08771; H04N 23/21; H04N 1/32149
See application file for complete search history.

(56) References Cited

U.S. PATENT DOCUMENTS 8,137,881 B2 3/2012 Jung
2011/0027713 A1* 2/2011 Jung ................. G03G 9/08764 430/108.1
(Continued)

FOREIGN PATENT DOCUMENTS

CN 101111338 A 1/2008
CN 102488524 A 6/2012
(Continued)

OTHER PUBLICATIONS

English machine translation of the description of JP-2007219103-A (Year: 2007).*

*Primary Examiner* — Boone Alexander Evans
(74) *Attorney, Agent, or Firm* — Canon U.S.A., Inc. IP Division

(57) ABSTRACT

Toner comprising toner particles, wherein the toner contains gold nanorods, and wherein in a case where an aspect ratio distribution of the gold nanorods contained in the toner is measured, an average value μ in the aspect ratio distribution is in a range of 6.0 to 13.0 and a standard deviation σ in the aspect ratio distribution is in a range of 0.5 to 4.5.

12 Claims, 2 Drawing Sheets

(51) Int. Cl.
*G03G 9/087* (2006.01)
*H04N 1/32* (2006.01)
*H04N 23/21* (2023.01)

(52) U.S. Cl.
CPC ..... *G03G 9/08771* (2013.01); *H04N 1/32149* (2013.01); *H04N 23/21* (2023.01)

(56) References Cited

U.S. PATENT DOCUMENTS

| | | | | |
|---|---|---|---|---|
| 2019/0243270 | A1* | 8/2019 | Nozaki | G03G 9/097 |
| 2020/0390908 | A1 | 12/2020 | Singh | |

FOREIGN PATENT DOCUMENTS

| | | | | |
|---|---|---|---|---|
| CN | 102695990 | A | | 9/2012 |
| CN | 111511484 | A | | 8/2020 |
| JP | H11316473 | A | | 11/1999 |
| JP | 2006070300 | A | | 3/2006 |
| JP | 2006169544 | A | | 6/2006 |
| JP | 2007219103 | A | * | 8/2007 |
| JP | 2013509479 | A | | 3/2013 |
| JP | 2021501832 | A | | 1/2021 |
| WO | 2016010049 | A1 | | 1/2016 |

* cited by examiner

TONER AND IMAGE READING METHOD

CROSS-REFERENCE TO RELATED APPLICATIONS

This application is a Continuation of International Patent Application No. PCT/JP2022/002904, filed Jan. 26, 2022, which claims the benefit of Japanese Patent Applications No. 2021-012778, filed Jan. 29, 2021, and No. 2021-151226, filed Sep. 16, 2021, all of which are hereby incorporated by reference herein in their entirety.

BACKGROUND OF THE INVENTION

Field of the Invention

The present disclosure relates to toner and an image reading method.

Background Art

An "invisible printing" technique for embedding information as an invisible image in a printed material for the purpose of security enhancement, such as copyright protection and anti-counterfeiting, has recently been attracting attention. In the invisible printing, an invisible image is less likely to deteriorate the appearance of a visible image even when the invisible image is superimposed on the visible image. Accordingly, the invisible image can be used in combination with embedded information while maintaining the quality of a general printed material. Such invisible printing is expected to be applied in various fields including security fields.

Japanese Patent Application Laid-Open No. 2007-219103 discusses a technique for forming an invisible image using toner containing specific gold nanorods without impairing the quality of a visible image.

CITATION LIST

Patent Literature

PTL 1: Japanese Patent Laid-Open No. 2007-219103

As a result of studying the toner discussed in Japanese Patent Application Laid-Open No. 2007-219103, the present inventors recognized that it may be desirable to further improve the invisibility of an image in a visible light region and the reading performance of an image in a near-infrared region.

SUMMARY OF THE INVENTION

One aspect of the present disclosure is directed to providing toner with which an invisible image having excellent invisibility in a visible light region and having an excellent reading performance in a near-infrared region can be obtained.

Another aspect of the present disclosure is directed to providing an image reading method for reading an image formed using the toner according to the present disclosure.

According to an aspect of the present disclosure, toner comprising toner particles, wherein the toner contains gold nanorods, and wherein in a case where an aspect ratio distribution of the gold nanorods contained in the toner is measured, an average value in the aspect ratio distribution is in a range of 6.0 to 13.0 and a standard deviation $\sigma$ in the aspect ratio distribution is in a range of 0.5 to 4.5.

According to another aspect of the present disclosure, it is possible to provide an image reading method including a process of reading an image formed with the toner according to the present disclosure using an apparatus equipped with a near-infrared sensor.

According to one aspect of the present disclosure, it is possible to provide toner with which an invisible image having excellent invisibility in a visible light region and having an excellent reading performance in a near-infrared region can be obtained.

According to another aspect of the present disclosure, it is possible to provide an image reading method including a process of reading an image formed with the toner according to the present disclosure using an apparatus equipped with a near-infrared sensor.

Further features of the present invention will become apparent from the following description of exemplary embodiments with reference to the attached drawings.

DESCRIPTION OF THE EMBODIMENTS

Figure 1:
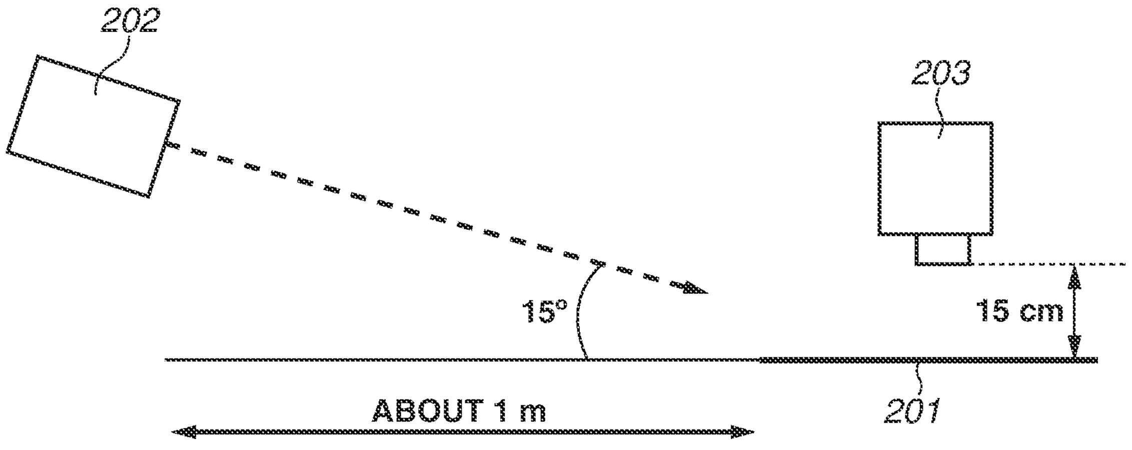
FIG. 1 is a schematic view illustrating an image observation state in an image quality evaluation in a near-infrared region.

The description of "xx or more and yy or less" and "xx to yy" indicating a numerical range means a numerical range including a lower limit and an upper limit which are end points, unless otherwise specified. In addition, in a case where numerical ranges are described in stages, the upper limit and the lower limit of each numerical range can be arbitrarily combined.

Toner according to the present disclosure may be preferably toner for invisible image formation.

<Circumstances Leading to the Present Invention>

According to the technique discussed in Japanese Patent Application Laid-Open No. 2007-219103, an image reading performance in a near-infrared region can be reliably enhanced. On the other hand, the present inventors found that, if the content of gold nanorods is increased to enhance the image reading performance, the invisibility of an image is more likely to deteriorate. The present inventors speculate that this is because a maximum absorbance in the near-infrared region is not sufficiently large with respect to a maximum absorbance in a visible light region in an optical absorption spectrum of a fixed image. Accordingly, the present inventors speculate that, as the content of gold nanorods contained in toner is increased, not only the maximum absorbance in the near-infrared region, but also the maximum absorbance in the visible light region increases along with the increase in the content of gold nanorods, which leads to deterioration in invisibility of an image.

Toner used to form an invisible image is required to be capable of forming an image having excellent invisibility and an excellent reading performance. Accordingly, the present inventors recognized that it may be desirable to make improvements to obtain an image with a sufficiently large maximum absorbance in the near-infrared region with respect to the maximum absorbance in the visible light region.

As a result of study based on the above-described speculations, the present inventors found that toner containing gold nanorods in which an average value of aspect ratios is controlled to fall within a range of 6.0 to 13.0 and a standard deviation of the aspect ratios is controlled to fall within a range of 0.5 to 4.5 is effective to form an image including the above-described characteristics.

It has turned out that controlling the average value and the standard deviation of the aspect ratios of gold nanorods contained in toner to fall within the above-described ranges, respectively, makes a peak in an optical absorption spectrum of a fixed image sharper and makes the maximum absorbance in the near-infrared region relatively larger. This makes it possible to easily obtain an image having excellent invisibility and an excellent reading performance even with the same content of gold nanorods in toner.

<Gold Nanorods>

Toner contains gold nanorods. In the present disclosure, gold nanorods are metal nanorods composed primarily of gold. Metal nanorods composed primarily of gold refer to metal nanorods in which the content ratio of gold to the mass of the metal nanorods is 80% or more.

Metal nanorods refer to fine metal materials that are formed of metal materials of noble metals such as gold and silver and have a long-axis diameter and a short-axis diameter in a Transmission Electron Microscopy (TEM) image. Specifically, metal nanorods in a TEM image are observed as a substantially rectangular shape. Metal nanorods generally have a short-axis length of 1 nm to 60 nm and a long-axis length of 20 nm to 500 nm. The value obtained by dividing the long-axis length of a metal nanorod by the short-axis length of the metal nanorod is referred to as an aspect ratio. In the present disclosure, a metal nanorod having an aspect ratio of 1.5 or more is treated as a gold nanorod. A gold nanorod exhibits two characteristic plasmon absorption bands (bands corresponding to excitations of surface plasmon bands) due to the long-axis of the rod and the short-axis of the rod, respectively. For example, in the case of a gold nanorod, the absorption band due to the short axis is present in the vicinity of 530 nm, and the absorption band due to the long axis is present in a range of 650 nm to 2000 nm.

Gold elements and metallic elements other than gold in gold nanorods may have an alloy form obtained by compounding elements on the atomic level, or may have a core-shell form in which a nanorod composed singly of gold is coated with a metallic element other than gold. The gold nanorod may be coated with, for example, an inert shell such as silica or polystyrene. The surface of a gold nanorod may be modified with appropriate molecules, such as a surfactant, depending on intended use, for example, to disperse gold nanorods into a medium.

<Aspect Ratio Distribution>

The value obtained by dividing the long-axis length of a metal nanorod by the short-axis length of the metal nanorod is referred to as an aspect ratio. The aspect ratio of gold nanorods contained in toner has a distribution, and the aspect ratio distribution is represented by an average value and a standard deviation in the distribution. The distribution may be a normal distribution, an irregular distribution, or a multimodal distribution with a plurality of peaks.

The optical absorption spectrum of gold nanorods varies in a complicated manner along with a change in the aspect ratio distribution. However, as a result of intensive study, the present inventors found that, when the aspect ratio distribution of gold nanorods contained in toner is measured, the use of toner containing gold nanorods in which an average value $\mu$ in the aspect ratio distribution is in a range of 6.0 to 13.0 and a standard deviation $\sigma$ in the aspect ratio distribution is in a range of 0.5 to 4.5 makes it possible to easily form an invisible image having excellent invisibility in a visible light region and having an excellent reading performance in the near-infrared region.

If the above-described average value $\mu$ falls within the range of 6.0 to 13.0, an image having a peak within a wavelength range of 1000 to 1600 nm in an optical absorption spectrum can be easily obtained. It has turned out that, if the average value is less than 6.0, the peak position in the optical absorption spectrum is more likely to be close to the visible light region, and thus the invisibility of an image cannot be sufficient. This seems to be because light having a wavelength in the visible light region can be more easily absorbed. It has also turned out that, if the average value is greater than 13.0, the peak position in the optical absorption spectrum may be too far on the long wavelength side and the reading performance of an apparatus, such as an InGaAs camera, that reads the wavelength in the near-infrared region is more likely to deteriorate.

In view of the above, the average value $\mu$ in the aspect ratio distribution is 6.0 or more, preferably 7.0 or more, and more preferably 8.0 or more. Further, the average value $\mu$ may be 13.0 or less, preferably 12.0 or less, and more preferably 11.0 or less. Specifically, for example, the average value $\mu$ is preferably in a range of 7.0 to 12.0, and more preferably in a range of 8.0 to 11.0.

The present inventors also found that, when the standard deviation $\sigma$ in the aspect ratio distribution is 4.5 or less, the absorption wavelength in the near-infrared region due to gold nanorods is less likely to vary and the maximum absorbance in this region is relatively larger than the maximum absorbance in the visible light region.

An invisible image having excellent invisibility and an excellent invisible image reading performance can be easily obtained. Accordingly, the standard deviation $\sigma$ may be 4.5 or less, preferably 3.5 or less, and more preferably 2.5 or less. Although the lower limit is not particularly limited, the standard deviation $\sigma$ may be 0.5 or more.

Specifically, for example, the standard deviation $\sigma$ may be preferably in a range of 0.5 to 3.5, and more preferably in a range of 0.5 to 2.5.

The average value $\mu$ and the standard deviation $\sigma$ can be controlled by adjusting reaction conditions and refining conditions as described below.

Further, the average value of long-axis lengths of gold nanorods contained in toner particles is preferably less than or equal to ¼ of a weight-average particle diameter (D4) of the toner particles. Setting the average value of long-axis lengths of rods to be less than or equal to ¼ of the weight-average particle diameter of toner particles prevents the size of gold nanorods from being extremely larger than the size of toner particles. Additionally, the volume resistivity of toner is less likely to deteriorate, and thus appropriate charging characteristics of toner can be easily obtained and an invisible image with high quality can be easily obtained.

Further, the average value of long-axis lengths of gold nanorods contained in the toner is preferably in a range of 50 to 110 nm.

The toner according to the present disclosure can be obtained by dispersing gold nanorods that satisfy the range of the average value $\mu$ and the range of the standard deviation $\sigma$ according to the present disclosure into the toner, but instead the toner may contain gold nanorods that do not satisfy the range of the average value $\mu$ and the range of the standard deviation $\sigma$ according to the present disclosure (hereinafter also referred to as "second gold nanorods") without departing from the values. Examples of gold nanorods that can be contained in the toner may include gold nanorods in which the average value of the aspect ratio distribution is in a range of 1.6 to 2.6 in the measurement of the aspect ratio distribution, and gold nanorods in which the average value of the aspect ratio distribution is in a range of 2.0 to 2.2. When the optical absorption spectrum of the gold nanorods is measured, the spectrum has a peak in a range of 580 to 650 nm.

In the gold nanorods in which the average value satisfies a range of 6.0 to 13.0 and the standard deviation σ satisfies a range of 0.5 to 4.5, large peaks due to the long-axis of each gold nanorod can be observed in a wavelength range of 1000 to 1600 nm in the optical absorption spectrum. On the other hand, small peaks due to the short-axis of each gold nanorod can be observed in the vicinity of 530 mm, which is a visible light region, and can appear slightly in red. Accordingly, the addition of the above-described gold nanorods having a peak in the range of 580 to 650 nm in the optical absorption spectrum makes it possible to easily obtain an image with flatter optical absorption characteristics in the visible light region, that is, an image that has a lower chroma and is less likely to be visually observed.

<Content Ratio of Gold Nanorods>

The content ratio of gold nanorods contained in the toner is preferably in a range of 0.005 to 0.200% by mass. If the content ratio of the gold nanorods is 0.005% by mass or more, an invisible image having an excellent reading performance in the near-infrared region can be easily obtained. Accordingly, the content ratio of the gold nanorods is preferably 0.005% by mass or more, and more preferably 0.010% by mass or more. If the content ratio of the gold nanorods is 0.200% by mass or less, the volume resistivity of the toner is less likely to deteriorate and an invisible image with high quality can be easily obtained. Accordingly, the content ratio of the gold nanorods is preferably 0.200% by mass or less, and more preferably 0.100% by mass or less.

<Gold Nanoparticles>

Preferably, the toner does not contain gold nanoparticles, or contains gold nanoparticles at a ratio of 30% by number or less with respect to the number of gold nanorods contained in the toner. In the present disclosure, gold nanoparticles are nanomaterials composed primarily of gold, and are treated as the nanoparticles in which the aspect ratio in a TEM image is less than 1.5. The gold nanoparticles may be generated during preparation of gold nanorods. The gold nanoparticles exhibit light absorption in the visible light region depending on the particle diameter. For example, gold nanoparticles having a particle diameter of 20 nm exhibit light absorption in the vicinity of 520 nm.

If the toner does not contain gold nanoparticles, or contains gold nanoparticles at a ratio of 30% by number or less with respect to the number of gold nanorods, the light absorbance in the visible light region corresponding to the absorption wavelength of gold nanoparticles is small, and thus an image having excellent invisibility can be easily obtained. More preferably, the toner does not contain gold nanoparticles, or contains gold nanoparticles at the ratio of 15% by number or less. More preferably, the toner does not contain gold nanoparticles, or contains gold nanoparticles at the ratio of 10% by number or less. More preferably, the toner does not contain gold nanoparticles, or contains gold nanoparticles at the ratio of 5% by number or less.

The number ratio of gold nanoparticles can be controlled based on reaction conditions and refining conditions as described below.

<PEDOT-PSS>

The toner according to the present disclosure may contain poly(3,4-ethylenedioxythiophene)-poly(styrenesulfonic acid) (PEDOT-PSS). In the present disclosure, poly(3,4-ethylenedioxythiophene) is also referred to as PEDOT and poly(styrenesulfonic acid) is also referred to as PSS. PEDOT-PSS according to the present disclosure is treated as a composite of PEDOT and PSS.

PEDOT-PSS will be described. If an electron acceptor (acceptor) or electron donor (donor) is added to a conjugated polymer, a carrier (hole or electron) is generated in a main chain of the conjugated polymer, so that a polymer composite having electrical conductivity is formed. Such a polymer composite is generally referred to as a conductive polymer. Typical examples of the conjugated polymer include aliphatic conjugated polyacetylene, aromatic conjugated poly(p-phenylene), heterocyclic conjugated polypyrrole, polythiophene, and heteroatom conjugated polyaniline. Examples of the acceptor include halogen and Lewis acid. Examples of the donor include alkali metal and alkaline-earth metal.

The above-described conductive polymer exhibits infrared absorption due to the plasma oscillation of carriers. In other words, it can be considered that the infrared absorption is exhibited when a polymer composite of a conjugated polymer and an electron acceptor or an electron donor is formed. The infrared absorption of the conductive polymer is proportional to the carrier density, and thus the conductive polymer with higher conductivity exhibits higher infrared absorption.

In the PEDOT-PSS contained in the toner according to the present disclosure, PEDOT functions as a conjugated polymer and PSS functions as an acceptor, and PEDOT and PSS form a polymer composite, which exhibits high infrared absorption.

Figure 2:
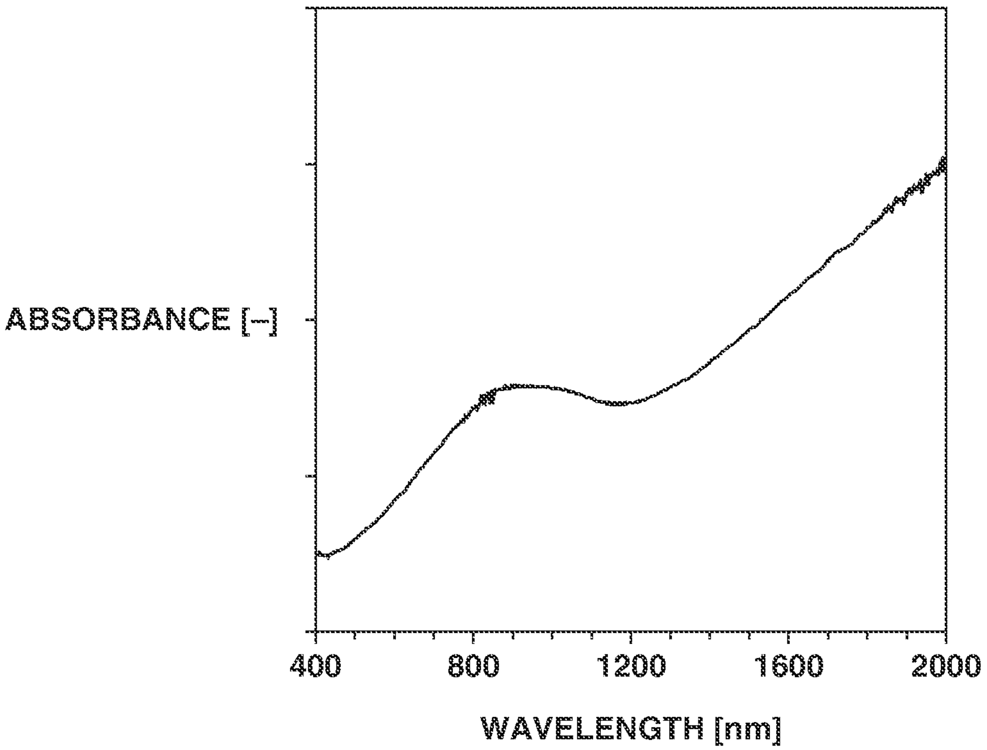
FIG. 2 is an optical absorption spectrum of PEDOT-PSS.

FIG. 2 illustrates an optical absorption spectrum of PEDOT-PSS. PEDOT-PSS has a large optical absorption band based on the plasma oscillation of carriers in the infrared region. Accordingly, the use of the toner containing PEDOT-PSS makes it possible to easily obtain an image with an excellent reading performance in the near-infrared region.

In FIG. 2, the light absorption due to the plasma oscillation of carriers reaches not only the infrared region, but also the visible light region of 500 to 800 nm. The light absorption reaching the visible light region makes small peaks, which are present in the vicinity of 530 nm due to the short-axis of each gold nanorod that satisfies the average value μ in the range of 6.0 to 13.0 and the standard deviation σ in the range of 0.5 to 4.5, flatter and makes it possible to easily obtain an image that has a lower chroma and is less likely to be visually observed.

PEDOT-PSS can also be manufactured by carrying out oxidative polymerization of 3,4-ethylenedioxythiophene, for example, under the presence of PSS. A commercially available item (e.g., Denatron PT-300 (trade name), manufactured by Nagase ChemteX Corporation) can also be obtained and used.

<Preparation of Gold Nanorods>

Examples of a method for preparing gold nanorods include an electrolysis method (Y Yuhoka, J. Phys. Chem, B, 101, 6661 (1997)) and a chemical synthesis method (N. R. Janahoka, J. Phys. Chem. B, 105, 4065 (2001)).

For example, a method of synthesizing gold nanorod particles by reducing gold ions in an aqueous solution containing an excessively large amount of cetyltrimethylammonium bromide (CTAB) as a quaternary ammonium base can be used. For details of the method, for example, see Japanese Patent Application Laid-Open No. 2006-118036, Japanese Patent Application Laid-Open No. 2006-169544, Chem. Commun. (2003), pp. 2376-2377. In this method, a CTAB aqueous solution is first added to a hydrogen tetrachloroaurate tetrahydrate aqueous solution and sodium borohydride is further added to the aqueous solution, thereby preparing a solution containing seed particles. A solution obtained by mixing silver nitrate, hydrogen tetrachloroaurate tetrahydrate, L-ascorbic acid, and CTAB is added to the solution and held for a certain period of time, or the solution is gradually added little by little, thereby facilitating anisotropic growth of seed particles as a nucleus and obtaining gold nanorods.

Further, in the case of growing seed particles, gold nanorods with a large aspect ratio can be obtained by adding benzyldimethylhexadecylammonium chloride. In addition, gold nanorods with a large aspect ratio can also be obtained by performing a reduction treatment at a first stage using sodium borohydride as a strong reducing agent, and then performing a reduction treatment using triethylamine as a weak reducing agent.

Further, gold nanorods can be refined, as needed, and the aspect ratio distribution can be adjusted and used. As a refining method, any generally known method can be used. For example, density gradient ultracentrifugation can be used. For details of the method, for example, see Li. S, et al., Nano Res. 4, 723-728 (2011). Specifically, a mixture solution of sucrose and CTAB with different concentrations is first prepared, and the solutions are superposed in a centrifuge tube in order of concentration gradient. A sample of gold nanorods is superposed on the solutions and then a centrifugation process is carried out, thereby separating the gold nanorods based on the concentration and size thereof. The separation and refining processes make it possible to reduce the standard deviation σ and obtain gold nanorods with a narrower aspect ratio distribution.

<Toner and Toner Particles>

Toner particles preferably contain a binder resin. The binder resin is not particularly limited. Specific examples of the binder resin may include a styrene acrylic-based resin, a polyester resin, and an epoxy resin. These resins can be used alone or as a mixture. The binder resin may be a resin having a linear molecule structure, a resin having a branch shape, a cross-linked resin, or a mixture thereof.

<Light Absorbance in Visible Light Region>

In a spectroscopic analysis of a fixed image formed using the toner according to the present disclosure with a toner loading amount of 0.30 mg/cm$^2$, a maximum value of a light absorbance in a wavelength range of 400 nm to 800 nm is preferably 10% or less. This wavelength range is a wavelength region corresponding to the visible region. If the absorbance of light is 10% or less, an image that cannot be substantially recognized with the naked eye and thus has excellent invisibility in the visible light region can be obtained.

<Light Transmittance in Visible Light Region>

In terms of invisibility of an image, in a spectroscopic analysis of a fixed image formed using the toner according to the present disclosure with a toner loading amount of 0.30 mg/cm$^2$, a maximum value of a light transmittance in a wavelength range of 400 nm to 800 nm is preferably 90% or more.

<Light Absorbance in Near-Infrared Region>

In a spectroscopic analysis of a fixed image formed with a toner loading amount of 0.30 mg/cm$^2$, a maximum value of a light absorbance in a wavelength range of 900 nm to 1800 nm is preferably 5% or more. This wavelength range is a wavelength region corresponding to the near-infrared region. If the absorbance of light is 5% or more, an invisible image can be clearly read using a near-infrared camera such as an InGaAs camera. More preferably, the absorbance of light is 10% or more.

If the toner is used as invisible toner in practice, the light absorption in an invisible region can be visualized using, for example, a camera equipped with a sensor (InGaAs sensor etc.) having sensitivity in a range of 900 nm to 1800 nm.

The absorbance of light in the visible light region and the infrared region can be controlled by adjusting the aspect ratio distribution of gold nanorods.

<Image Reading Method>

A method for reading an image formed using the toner according to the present disclosure is not particularly limited. The image formed using the toner according to the present disclosure is more likely to absorb the wavelength in the near-infrared region, and thus it may be desirable to employ an image reading method using an apparatus equipped with a near-infrared sensor. More preferably, an apparatus equipped with an InGaAs sensor may be used. More preferably, an InGaAs camera may be used. It may be preferable to employ an image reading method using light in a wavelength range of 900 to 2500 nm, and more preferably, in a wavelength range of 900 to 1800 nm.

<Weight-Average Particle Diameter (D4) of Toner Particles>

The weight-average particle diameter (D4) of toner particles is preferably in a range of 4.0 μm to 9.0 μm, and more preferably, in a range of 5.0 μm to 7.0 μm. The weight-average particle diameter (D4) within this range is advantageous for high definition image formation.

<Toner Manufacturing Method>

A toner manufacturing method is not particularly limited. For example, the following toner manufacturing methods (1) to (3) can be used.

(1) Pulverization Method

In the case of manufacturing toner by a pulverization method, metal nanorods including gold nanorods are first sufficiently mixed with binder resins as a dispersion medium or another additive by a mixer such as a Henschel mixer or a ball mill. This mixture is melted and kneaded using a heat kneader, such as a kneader or an extruder, that uses heat and a mechanical shear force, and the resins are made compatible with each other. The melted and kneaded material is cooled and solidified, and then the solidified material is pulverized and pulverized materials are classified to thereby obtain toner particles having an intended particle diameter.

(2) Suspension Polymerization Method

In a suspension polymerization method, for example, metal nanorods including gold nanorods, polymerizable monomers that can form a binder resin, and, if necessary, a polymerization initiator, a cross-linking agent, a charge control agent, and other additives are uniformly dispersed, thereby obtaining polymerizable monomer compositions. After that, the obtained polymerizable monomer compositions are dispersed and granulated in a continuous layer (e.g., aqueous phase) containing a dispersion stabilizer using an appropriate stirrer, and a polymerization reaction process is carried out using a polymerization initiator, thereby obtaining toner particles having a desired particle diameter.

(3) Emulsion Coagulation Method

In the case of manufacturing toner by an emulsion coagulation method, materials such as metal nanorods including gold nanorods, binder resins, and other additives are first dispersed and mixed in an aqueous medium containing a dispersion stabilizer. A surfactant may be added into the aqueous medium. After that, toner particles are coagulated to obtain a desired toner particle diameter by adding a flocculant. After that, or simultaneously with the coagulation, resin fine particles are fused. Further, as needed, shape control is performed using heat to thereby form toner particles. After that, a filtration cleaning process and a drying process are carried out to thereby obtain toner particles.

A series of toner manufacturing processes may include, as needed, a process of dispersing metal nanorods in a binder resin.

As a method for dispersing metal nanorods in a binder resin, for example, a method using a masterbatch during the toner manufacturing processes can be used. Specifically, metal nanorods are mixed with some of binder resins so that the metal nanorods are contained at high concentration, and the melting and kneading process is carried out with the application of a high shear force, thereby manufacturing a masterbatch in which metal nanorods are finely dispersed. After that, the masterbatch is melted and kneaded while being diluted with remaining binder resins. As a melting and kneading apparatus suitably used to manufacture the masterbatch, a kneader, a Banbury mixer, two rolls, three roll mills, or the like can be used. These can be used alone or in combination. As a melting and kneading apparatus used for dilution and kneading, a biaxial kneader or the like can be used.

A series of toner manufacturing processes may include, as needed, a process of preventing aggregation of metal nanorods.

As a method for preventing aggregation of metal nanorods during the toner manufacturing processes, for example, a method of quenching metal nanorods after the melting and kneading process can be used. For example, a melted and kneaded material is expanded in a sheet form on a water-cooled metal belt, thereby making it possible to quench the melted and kneaded material. The rapid cooling prevents aggregation of metal nanorods caused during cooling. As a cooling apparatus suitable for rapid cooling, for example, an "NR double-belt cooler for high viscosity (manufactured by Nippon Belting Co., Ltd.)", a "cooling and solidifying machine belt drum flaker (manufactured by Nippon Coke & Engineering Co., Ltd.)", and a "cooling and solidifying apparatus drum flaker (manufactured by Katsuragi Industry Co., Ltd.)" can be used.

The process of dispersing metal nanorods in a binder resin and the method for preventing aggregation of metal nanorods may be used in combination.

<Various Additives>

The toner may contain, as needed, one or more types of additives selected from the group consisting of wax, a charge control agent, an external additive, and the like. Further, the toner according to the present disclosure preferably does not contain any coloring component that can change a fixed image into a visible image.

<Wax>

The wax is not particularly limited, but wax having no color or a light color is preferably used. The following wax can be used.

Hydrocarbon wax, ester wax, amide wax, higher aliphatic alcohol, higher fatty acid, and the like can be used. One type of wax may be used singly, or a plurality of types of wax may be used in combination.

<Charge Control Agent>

The charge control agent is not particularly limited, but a charge control agent having no color or a light color is preferably used. Examples of the charge control agent are described below.

Examples of the charge control agent include aromatic oxycarboxylic acid, a metal compound of aromatic oxycarboxylic acid, a boron compound, a quaternary ammonium salt, calixarene, a resin including a sulfonic acid (salt) group, and a resin including a sulfonic acid ester group. One type of charge control agent may be used singly, or a plurality of types of charge control agent may be used in combination.

<External Additive>

The external additive is not particularly limited, but an external additive having no color or a light color is preferably used. The following external additives can be used.

Silica, alumina, titanium oxide, strontium titanate, silicon nitride, polytetrafluoroethylene, zinc stearate, and the like can be used. The surface of the external additive may be subjected to a hydrophobization treatment.

The average particle diameter of primary particles of the external additive is preferably 1/10 or less of the weight-average particle diameter (D4) of toner particles.

<Developer>

The toner may be used as single-component developer, or may be used as two-component developer by mixing toner with carrier. As the carrier, for example, metal such as iron, ferrite, and magnetite, an alloy of these metals and another metal such as aluminum or lead, and magnetic particles composed of known materials can be used. In addition, a coated carrier, the surface of which is coated with a coating such as a resin, a resin-dispersed carrier obtained by dispersing magnetic particles in a binder resin may also be used. The volume average particle diameter of the carrier is preferably in a range of 15 μm to 100 μm, and more preferably, in a range of 25 μm to 80 μm.

<Various Measurement Methods Etc.>

Various physical properties are measured as follows.

<Method of Measuring Weight-Average Particle Diameter (D4) of Toner Particles>

The weight-average particle diameter (D4) of toner particles is calculated as follows.

As a measurement apparatus, a precision particle diameter distribution measurement apparatus "Coulter Counter Multisizer 3" (registered trademark, manufactured by Beckman Coulter, Inc.) that is provided with a 100-μm aperture tube and employs resistive pulse sensing is used. Setting of measurement conditions and analysis of measurement data use attached dedicated software "Beckman Coulter Multisizer 3 Version 3.51" (manufactured by Beckman Coulter, Inc.). The measurement is performed with twenty-five thousand effective measurement channels.

As an electrolyte aqueous solution used for measurement, an aqueous solution obtained by dissolving special grade sodium chloride in ion-exchanged water with a concentration of about 1% by mass, for example, "ISOTON II" (manufactured by Beckman Coulter, Inc.) can be used.

Before the measurement and analysis, the above-described dedicated software is set as follows.

On the "standard measurement method (SOM) change" screen of the above-described dedicated software, the total count value in a control mode is set to 50,000 particles, the number of times of measurement is set to one, and a value obtained using "standard particles 10.0 μm" (manufactured by Beckman Coulter, Inc.) is set as a Kd value. A threshold and a noise level are automatically set by pressing a "threshold/noise level measurement button". A current is set to 1600

μA, a gain is set to 2, and an electrolyte solution is set to ISOTON II, and then "flush aperture tube after measurement" is checked. On the "conversion setting from pulse to particle diameter" screen of the above-described dedicated software, a bin spacing is set to a logarithmic particle diameter, the number of particle diameter bins is set to 256, and a particle diameter range is set to a range of 2 μm to 60 μm.

A specific measurement method is described below.

(1) About 200 ml of the electrolyte aqueous solution is put into a 250-mL round-bottom beaker made of glass exclusively for Multisizer 3. The beaker is set on a sample stand, and the electrolyte aqueous solution in the beaker is stirred with a stirrer rod at 24 rotations/sec in a counterclockwise direction. Then, contamination and bubbles in the aperture tube are removed by the "flush of aperture" function of the dedicated software.

(2) About 30 mL of the electrolyte aqueous solution is put into a 100 mL flat-bottom beaker made of glass. About 0.3 mL of a diluted liquid obtained by diluting "Contaminon N" (10% by mass of aqueous solution of pH 7 neutral detergent for cleaning a precision measurement instrument, the aqueous solution including a nonionic surfactant, an anionic surfactant, and an organic builder, manufactured by FUJIFILM Wako Pure Chemical Corporation) about 3 times by mass with ion-exchanged water is added thereto as a dispersant.

(3) An ultrasonic disperser "Ultrasonic Dispersion System Tetora 150" (manufactured by Nikkaki Bios Co. Ltd.) with an electric output of 120 W is prepared by incorporating two oscillators having an oscillatory frequency of 50 kHz in a state where the phase of each oscillator is shifted by 180 degrees. About 3.3 l of ion-exchanged water is put into a water bath of the ultrasonic disperser, and about 2 mL of Contaminon N is added to the water bath.

(4) The beaker described in section (2) is set in a beaker-fixing hole in the ultrasonic disperser, and the ultrasonic disperser is activated. The height position of the beaker is adjusted so that the resonant state of the fluid level of the electrolyte aqueous solution in the beaker is maximized.

(5) About 10 mg of toner particles are gradually added little by little and dispersed in the electrolyte aqueous solution in the beaker described in section (4) in a state where the electrolyte aqueous solution is irradiated with an ultrasonic wave. Then, the ultrasonic dispersion treatment is continued for an additional 60 seconds. The temperature of water in the water bath is appropriately adjusted so as to be kept at a temperature in a range of 10° C. to 40° C. upon ultrasonic dispersion.

(6) The electrolyte aqueous solution described in section (5), in which the toner particles are dispersed, is added dropwise by means of a pipette to the round-bottom beaker described in section (1), which is placed on the sample stand, and the measurement concentration is adjusted to approximately 5%. The measurements are carried out until the number of measurement particles reaches 50,000.

(7) Measurement data is analyzed using the above-described dedicated software attached to the apparatus, and the weight-average particle diameter (D4) is calculated. The "average diameter" on the "analysis/volume statistic (arithmetic mean)" screen when graph/volume % is set by the dedicated software corresponds to the weight-average particle diameter (D4).

<Method of Quantitating Metal Content in Metal Nanorod Dispersion>

The metal content in the metal nanorod dispersion can be quantified by an inductively coupled plasma (ICP) emission spectroscopic analysis method based on Japanese Industrial Standards (JIS) K 0116-2014. First, the metal nanorod dispersion is heated at 60° C. on a hot plate and is dried and hardened. Then, aqua regia is added to the resultant, and a microwave-assisted acidolysis is performed using ETHOS PRO (manufactured by Milestone General K.K.) or the like. The ICP emission spectroscopic analysis is performed on the liquid using CIROS CCD (manufactured by SPECTRO Inc.), thereby making it possible to quantify the metal content.

<Method of Measuring Aspect Ratio Distribution of Gold Nanorods Contained in Toner>

To measure the aspect ratio distribution of gold nanorods contained in the toner, the gold nanorods contained in the toner are first separated and collected.

First, the toner is dissolved using a solvent with which binder resins can be dissolved. Next, the gold nanorods are precipitated by centrifugal separation and the supernatant solution is separated. The centrifugal separation is performed again by adding a new solvent, and the supernatant solution is separated. This operation is repeated several times for cleaning. Then, the solvent is finally dried and removed, thereby making it possible to separate and collect gold nanorods from the toner. The collected gold nanorods are re-dispersed in a solvent such as tetrahydrofuran (THF), thereby obtaining a measurement sample.

The measurement sample dispersed in the solvent is dropped onto a support membrane and dried, thereby performing TEM observation with a transmission electron microscope "Technai F30 (manufactured by FEI Corporation)" or the like. The long-axis length and the short-axis length of the observed gold nanorods are obtained by image processing software such as Photoshop, and the average value and standard deviation in the aspect ratio distribution and the average value of long-axis lengths of gold nanorods can be obtained.

<Method of Measuring Number Ratio of Gold Nanoparticles Contained in Toner to Gold Nanorods>

The number ratio of gold nanoparticles contained in the toner to gold nanorods can be measured such that the number of gold nanoparticles and the number of gold nanorods are counted by TEM observation, and the ratio between the number of gold nanoparticles and the number of gold nanorods is calculated.

<Method of Measuring Content of Gold Nanorods Contained in Toner>

The content (mass %) of gold nanorods contained in the toner is quantified by fluorescent X-ray analysis. The measurement is based on JIS K 0119-1969 as described in detail below.

As a measurement apparatus, a wavelength dispersion type fluorescence X-ray analysis apparatus "Axios" (manufactured by Malvern Panalytical Ltd.) and attached dedicated software "SuperQ ver. 4.0F" (manufactured by Malvern Panalytical Ltd.) for measurement condition setting and measurement data analysis are used. Note that Rh is used as an anode of an X-ray tube, a vacuum atmosphere is set as a measurement atmosphere, a measurement diameter (collimator mask diameter) is 27 mm, and a measurement time is 10 seconds. Alight element is measured using a proportional counter (PC), and a heavy element is measured or detected using a scintillation counter (SC).

As a measurement sample, 4 g of toner particles are placed into a dedicated aluminum ring for pressing, are leveled off and pressurized for 60 seconds at a pressure of 20 MPa using a tablet molding compressor "BRE-32" (manufactured by Maekawa Testing Machine MFG. Co., Ltd.), and are molded into a pellet having a thickness of 2 mm and a diameter of 39 mm. The pellet thus obtained is used.

The measurement was made under the above-described conditions, elements are identified based on peak positions of the obtained X-ray, and a counting rate (units: kcps) is measured as the number of X-ray photons per unit time. Then, the content of gold nanorods contained in the toner is calculated using a calibration curve created separately. In the case of creating the calibration curve, a finely pulverized material of a styrene-based resin and a predetermined amount of gold nanorods are uniformly mixed with each other using a coffee mill, and a pellet produced in the same manner as described above is used as a measurement sample.

EXAMPLES

The present disclosure will be described in more detail below with reference to examples. However, the present disclosure is not limited to the examples. Measurement results in the examples are obtained by the above-described measurement methods.

Preparation Example of Gold Nanorod Dispersion A

A seed particle solution was first prepared. Then, 500 mL of 0.0005 mol/L chloroauric acid tetrahydrate (Kishida Chemical Co., Ltd.) aqueous solution and 500 mL of 0.2 mol/L cetyltrimethylammonium bromide (Kishida Chemical Co., Ltd.) aqueous solution were mixed. Then, 60 mL of 0.01 mol/L sodium borohydride (Tokyo Chemical Industry Co., Ltd.) was added to the aqueous solution, thereby obtaining a seed particle solution (solution A).

Next, 10 g of cetyltrimethylammonium bromide was dissolved in 500 mL of 0.15 mol/L benzyldimethylhexadecylammonium chloride (Tokyo Chemical Industry Co., Ltd.) aqueous solution. Then, 20 mL of 0.004 mol/L silver nitrate aqueous solution was added to an aqueous solution containing these two types of surfactant. Further, 500 mL of 0.001 mol/L chloroauric acid tetrahydrate aqueous solution was added to the aqueous solution, and then 7 mL of 0.078 mol/L L-ascorbic acid aqueous solution (Kishida Chemical Co., Ltd.) was further added. This solution was used as solution B.

Next, 10 g of cetyltrimethylammonium bromide was dissolved in 500 mL of 0.15 mol/L benzyldimethylhexadecylammonium chloride (Tokyo Chemical Industry Co., Ltd.) aqueous solution. Then, 20 mL of 0.004 mol/L silver nitrate aqueous solution was added to an aqueous solution containing the two types of surfactant. After 500 mL of 0.0005 mol/L chloroauric acid tetrahydrate aqueous solution was added to the aqueous solution, 3.6 mL of 0.078 mol/L L-ascorbic acid aqueous solution (Kishida Chemical Co., Ltd.) was further added. This solution was used as solution C.

Then, 1.2 mL of the solution A was added dropwise to the solution B, and 2.0 mL of the solution C was added at a rate of 1.0 mL/20 min, and seed particles were anisotropically grown as a nucleus. After centrifugal separation at 10,000×g for five minutes, the gold nanorods were re-dispersed in THF so as to obtain the content ratio of 0.02% by mass and the gold nanorod dispersion (dispersion A) was obtained. Table 1 illustrates physical properties of gold nanorods contained in the dispersion A.

Preparation Examples of Gold Nanorod Dispersions B to J

Dispersions B to J were obtained by performing an operation similar to that in the preparation example of the dispersion A, except that the amount of the solution C and the presence or absence of the following refining process were changed as illustrated in Table 1 in the manufacturing example of the gold nanorod dispersion A.

(Refining Process)

The centrifugation process was performed on 6 mL of the obtained gold nanorod dispersion at 10,000×g for five minutes, and then the obtained pellet was re-suspended in 0.05 mL of 0.01 M CTAB aqueous solution to obtain a gold nanorod suspension. In addition, sucrose solutions were prepared by adding sucrose to 0.01 M CTAB aqueous solution at 10% by mass, 15% by mass, 20% by mass, and 25% by mass, respectively. Then, 3 mL of each solution containing sucrose was charged into a 15 mL polyallomer tube in descending order of sucrose concentration, and the above-described gold nanorod suspension was finally superimposed. Then, the centrifugation process was carried out at 25° C. and 10750×g for 15 minutes using a high-speed refrigerated centrifuge "Avanti JXN-30". After the centrifugation process, the solution was divided into each fraction of 300 μL, and a TEM image of each fraction containing gold nanorods was observed. Among the fractions, the centrifugation process was carried out at 10,000×g for five minutes on each fraction in which the average value μ and the standard deviation σ of aspect ratios calculated based on the TEM image were desired values, and gold nanorods were collected as a precipitate. Then, the collected gold nanorods were re-dispersed in THE so as to obtain the content ratio of 0.02% by mass.

Preparation Example of Gold Nanorod Dispersion K

[Preparation of Seed Particle Solution]

First, the seed particle solution (solution A) similar to that described above was prepared.

Next, 5.0 mL of 0.004 mol/L silver nitrate (Kishida Chemical Co., Ltd.) aqueous solution was added to 500 mL of 0.2 mol/L cetyltrimethylammonium bromide aqueous solution in another container. Then, 500 mL of 0.001 mol/L chloroauric acid tetrahydrate aqueous solution was added to the aqueous solution, and 7 mL of 0.078 mol/L L-ascorbic acid aqueous solution (Kishida Chemical Co., Ltd.) was further added. This solution was used as solution B.

Then, 1.2 mL of the solution A was added dropwise to the solution B. The temperature of this solution was kept at 30° C. for 20 minutes, and seed particles were anisotropically grown as a nucleus, so that particle dispersion K1 was obtained.

[Refining Process]

Dispersion K was prepared by performing an operation similar to that of the refining process in the manufacturing example of the dispersion A using the particle dispersion K1 obtained as described above. Table 1 illustrates physical properties of gold nanorods (second gold nanorods) contained in the dispersion K. When the optical absorption spectrum of gold nanorods contained in the dispersion K was measured, the peak wavelength of the light absorption in the spectrum was 610 nm.

TABLE 1

| | Solution C (mL) | Refining Process | Average Value μ | Standard Deviation σ |
|---|---|---|---|---|
| Dispersion A | 2.0 | None | 6.0 | 3.5 |
| Dispersion B | 2.0 | Present | 6.0 | 1.0 |
| Dispersion C | 22.0 | None | 12.0 | 4.5 |
| Dispersion D | 12.0 | None | 9.0 | 3.5 |
| Dispersion E | 22.0 | Present | 12.0 | 1.5 |
| Dispersion F | 8.0 | Present | 8.0 | 1.5 |
| Dispersion G | 12.0 | Present | 9.0 | 2.5 |
| Dispersion H | 18.0 | Present | 11.0 | 1.5 |
| Dispersion I | 0.0 | None | 5.0 | 4.5 |
| Dispersion J | 28.0 | None | 14.0 | 4.5 |
| Dispersion K | — | Present | 2.1 | 0.5 |

Manufacturing Example of Saturated Polyester 1 Dispersion 20.0 parts by mass of saturated polyester 1 (polycondensate of ethylene oxide-modified bisphenol A and terephthalic acid, glass-transition temperature of 60° C., weight-average molecular weight of 29000, and number average molecular weight of 6000)

80.0 parts by mass of THF

The above-described materials were fully mixed and the saturated polyester 1 dispersion was obtained.

Manufacturing Example of Toner 1

33.0 parts by mass of gold nanorod dispersion A 67.0 parts by mass of saturated polyester 1 dispersion The above-described materials were sufficiently stirred with a magnetic stirrer, and were added dropwise to heptane (manufactured by Kishida Chemical Co., Ltd.) and were re-precipitated. The precipitate was collected by suction and filtration and a mixture of gold nanorods and saturated polyester was obtained in a powder state. Then, 5.0 parts by mass of ester wax (peak temperature of a maximum endothermic peak in Differential Scanning Calorimetry (DSC) measurement=70° C., Mn=704) were added to 100 parts by mass of this mixture, and the above-described materials were sufficiently mixed with an FM Mixer (manufactured by Nippon Coke & Engineering Co., Ltd.). Then, the mixture was melted and kneaded using a "PCM-30 type" (manufactured by Ikegai Corporation), the temperature of which was set to 130° C., thereby obtaining a kneaded material. The obtained kneaded material was expanded in a sheet form on a water-cooled metal belt and quenched, and then the kneaded material was coarsely pulverized to 1 mm or less with a hammermill, thereby obtaining a coarsely pulverized material. The coarsely pulverized material was finely pulverized with "T-250" (manufactured by Freund-Turbo Corporation). Further, classification was performed using "200TSP" (manufactured by Hosokawa Micron Corporation), thereby obtaining toner particles 1 having a weight-average particle diameter of 5.9 μm.

<External Addition Process>

The obtained toner particles 1 and hydrophobic silica fine powder (number average particle diameter of primary particles: 7 nm) subjected to a surface treatment with hexamethyldisilazane were mixed with each other in amounts of 100.0 parts by mass and 1.0 part by mass, respectively, using the FM Mixer (manufactured by Nippon Coke & Engineering Co., Ltd.), thereby obtaining toner 1.

Manufacturing Examples of Toner 2 to 13, 15 to 18, 21, and 22

Toner 2 to 13, 15 to 18, 21, and 22 were obtained by performing an operation similar to that in the manufacturing example of the toner 1, except that the type and amount of gold nanorod dispersion and the amount of saturated polyester dispersion were changed as illustrated in Table 2. Table 2 illustrates physical properties of toner 2 to 13, 15 to 18, 21, and 22.

Manufacturing Example of Toner 14

<Aqueous Medium Preparation Process>

First, 1000.0 parts by mass of ion-exchanged water and 14.0 parts by mass of potassium phosphate-12 hydrate were injected into a reaction container and kept at 65° C. for one hour under nitrogen purging. Then, the solution was stirred at 12,000 rpm using a high-speed stirrer "T. K. Homomixer" (manufactured by PRIMIX Corporation). A calcium chloride aqueous solution resulting from dissolving 9.2 parts by mass of calcium chloride-2 hydrate in 20.0 parts by mass of ion-exchanged water was injected all at once to prepare an aqueous medium containing a fine dispersion stabilizer.

<Polymerizable Monomer Composition Preparation Process>

A mixture was obtained by mixing the following materials.

44.8 parts by mass of gold nanorod dispersion I 128.9 parts by mass of styrene 34.0 parts by mass of n-butyl acrylate 1.0 parts by mass of aluminum salicylate compound (Bontron E-88, manufactured by Orient Chemical Industries Co., Ltd.)

5.0 parts by mass of saturated polyester 2 (polycondensate of propylene oxide modified bisphenol A and isophthalic acid, glass-transition temperature of 65° C., weight-average molecular weight of 10,000, and number average molecular weight of 6,000)

10.0 parts by mass of ester wax (melting point 73° C.)

0.1 parts by mass of divinylbenzene

A polymerizable monomer composition was prepared by keeping the temperature of this mixture at 65° C. and uniformly dissolving and dispersing the mixture at 500 rmp using T. K. Homo Mixer.

<Granulation Process>

The above-described polymerizable monomer composition was placed into the aqueous medium including the above-described dispersion stabilizer, while the temperature of the aqueous medium was kept at 70° C. and the rotational speed of the T. K. Homo Mixer was kept at 12,000 rpm, and 10.0 parts by mass of t-butyl peroxypivalate was added as a polymerization initiator. After that, the resultant was granulated for 10 minutes while the rotational speed was kept at 12,000 rpm.

<Polymerization Process>

After the granulation process, the polymerization process was carried out for five hours while the solution was stirred at 150 rpm using a propeller stirring blade in place of the stirrer and the temperature was kept at 70° C. Then, the temperature was increased to 85° C. to heat the solution for two hours to thereby complete the polymerization reaction.

<Cleaning and Drying Processes>

After completion of the polymerization process, the liquid was cooled to the room temperature and the pH of the solution was adjusted to pH 1.5 by adding diluted hydrochloric acid, and was stirred for three hours. After that, the filtration and cleaning processes were repeated and a toner cake was obtained.

The obtained toner cake was shredded, and then the toner cake was dried with an airflow drier. Further, the toner cake was cut into a fine powder and a coarse powder with a multi-grade classifier using the Coanda effect, thereby obtaining toner particles 14 having the weight-average particle diameter (D4) of 6.3 μm.

<External Addition Process>

First, 100.0 parts by mass of the obtained toner particles 14 and 1.0 parts by mass of hydrophobic silica fine powder (primary particles with the number average particle diameter of 7 nm) subjected to a surface treatment using hexamethyldisilazane were mixed by a high-speed mixer "FM Mixer" (manufactured by Nippon Coke & Engineering Co., Ltd.), thereby obtaining toner 14. Table 2 illustrates physical properties of the toner 14.

Manufacturing Example of Toner 19

Toner 19 was obtained by performing an operation similar to that in the manufacturing example of the toner 1, except that the gold nanorod dispersion D was used in place of the gold nanorod dispersion Ain the manufacturing example of the toner 1 and 33.0 parts by mass of the PEDOT-PSS dispersion was added. Table 2 illustrates physical properties of the toner 19.

Manufacturing Example of Toner 20

Toner 20 was obtained by performing an operation similar to that in the manufacturing example of the toner 1, except that the gold nanorod dispersions F and H were used in place of the gold nanorod dispersion A in the manufacturing example of the toner 1, and 2.0 parts by mass of the dispersion K (second gold nanorod dispersion) was added. Table 2 illustrates physical properties of the toner 20. When the aspect ratio distribution of gold nanorods contained in the toner 20 was measured, the average value was 7.6 and the standard deviation σ was 2.1 in the aspect ratio distribution.

TABLE 2

| Table 2 | Metal Nanorod dispersion Type | Metal Nanorod dispersion Parts by Mass | Saturated Polyester Dispersion Parts by Mass | PEDOT-PSS Parts by Mass | Second Metal Nanorod dispersion Parts by Mass | Average Value (nm) of Long-Axis Lengths | Number Ratio of Gold Nanoparticles |
|---|---|---|---|---|---|---|---|
| Toner 1 | A | 33 | 67 | 0 | 0 | 54 | 17% by number |
| Toner 2 | B | 33 | 67 | 0 | 0 | 54 | <1% by number |
| Toner 3 | C | 33 | 67 | 0 | 0 | 108 | 23% by number |
| Toner 4 | D | 33 | 67 | 0 | 0 | 81 | 21% by number |
| Toner 5 | E | 33 | 67 | 0 | 0 | 108 | <1% by number |
| Toner 6 | F | 33 | 67 | 0 | 0 | 72 | <1% by number |
| Toner 7 | G | 33 | 67 | 0 | 0 | 81 | <1% by number |
| Toner 8 | H | 33 | 67 | 0 | 0 | 99 | <1% by number |
| Toner 9 | F | 17 | 83 | 0 | 0 | 72 | <1% by number |
| Toner 10 | G | 17 | 83 | 0 | 0 | 81 | <1% by number |
| Toner 11 | H | 17 | 83 | 0 | 0 | 99 | <1% by number |
| Toner 12 | F | 44 | 56 | 0 | 0 | 72 | <1% by number |
| Toner 13 | H | 44 | 56 | 0 | 0 | 99 | <1% by number |
| Toner 14 | H | 33 | 67 | 0 | 0 | 99 | <1% by number |
| Toner 15 | F | 13 | 87 | 0 | 0 | 72 | <1% by number |
| Toner 16 | F | 7 | 93 | 0 | 0 | 72 | <1% by number |
| Toner 17 | G | 44 | 56 | 0 | 0 | 81 | <1% by number |
| Toner 18 | G | 52 | 48 | 0 | 0 | 81 | <1% by number |
| Toner 19 | D | 33 | 67 | 33 | 0 | 81 | <1% by number |
| Toner 20 | F | 33 | 67 | 0 | 2 | 72 | <1% by number |

TABLE 2-continued

| Table 2 | Metal Nanorod dispersion Type | Metal Nanorod dispersion Parts by Mass | Saturated Polyester Dispersion Parts by Mass | PEDOT-PSS Parts by Mass | Second Metal Nanorod dispersion Parts by Mass | Average Value (nm) of Long-Axis Lengths | Number Ratio of Gold Nanoparticles |
|---|---|---|---|---|---|---|---|
| Toner 21 | I | 44 | 56 | 0 | 0 | 45 | 24% by number |
| Toner 22 | J | 17 | 83 | 0 | 0 | 126 | 19% by number |

The average value of long-axis lengths in Table 2 is the average value of long-axis lengths of gold nanorods contained in toner. The number ratio of gold nanoparticles is the ratio of the number of gold nanoparticles to the number of gold nanorods contained in toner.

Example 1

<Evaluation of Image Quality in Near-Infrared Region>

A color printer (trade name: LBP652C, manufactured by Canon Inc.) modified to arbitrarily change the development contrast was used as an image forming apparatus, and toner in a black developing device was replaced with the toner 1. A4-sheets (trade name: GF-C081, Canon Marketing Japan Inc.) were used as output sheets, and images were output under an environment in which the temperature was 25° C. and the relative humidity was 60%.

A thin line image (20 lines, line width of 100 μm, spacing of 500 μm, and line length of 20 mm) was formed at a central portion of an A4-sheet using the black developing device. Next, a yellow solid image was formed so as to shield the thin line image using the A4-sheet on which the thin line image was formed and a yellow developing device. Thus, an evaluation image was obtained.

Next, as illustrated in FIG. 1, a light source 202 and a camera 203 were installed and an evaluation image 201 was observed. Specifically, the evaluation image was placed on a desk in a stationary state and was irradiated with an infrared ray using the light source 202 at a location apart from the evaluation image by about 1 μm at an angle of 15° with respect to the evaluation image. The camera 203 was installed at a distance of 15 cm immediately above the evaluation image, and the evaluation image was captured. As the light source 202, a halogen lamp light source (trade name: PCS-UHX-150, manufactured by NIPPON P•I CO., LTD.) equipped with a visible light cut filter unit was used. As the camera 203, a near-infrared camera (trade name: NVU3VD, InGaAs camera, manufactured by IRspec Corporation) in which a filter that cuts wavelength components of 800 nm or less is attached to a lens unit was used. The spectral sensitivity wavelength range of the near-infrared camera was 970 to 1650 nm.

The captured image was displayed on a display to check the twenty thin lines formed at the central portion of the evaluation image, and the number of thin lines that is complete and continuous over the entire length and that can be clearly observed was counted. Then, the image quality of the thin line image was evaluated based on the number of counted thin lines. Table 3 illustrates the results. It was determined that an advantageous effect was obtained when the counted number of thin lines is 13 or more.

<Evaluation of Invisibility in Visible Light Region>

<Method of Measuring Absorbance of Light in Wavelength Range of 400 nm to 800 nm>

A rectangular image of 1 cm×10 cm was formed using the image forming apparatus and the A4-sheet with the loading amount of the toner 1 of 0.30 mg/cm$^2$, thereby obtaining a sample image.

In the above-described sample image, a spectrometry measurement within a wavelength range of 400 nm to 800 nm was carried out using a photometer, and a maximum absorbance in the measurement was set as the measured value (%) of the sample image. As the photometer, an ultraviolet-visible-near-infrared spectrophotometer (trade name: UV-3600, manufactured by Shimadzu Corporation) equipped with an integrating sphere attachment (trade name: ISR-240A, manufactured by Shimadzu Corporation) was used. A spectrometry measurement was also performed on a single sheet (paper with no image formed thereon) as a blank.

The value obtained by subtracting the measured value (%) of the blank from the measured value (%) of the sample image was set as a visible light absorbance (%), and the invisibility of toner was evaluated using the visible light absorbance (%). Table 3 illustrates the results. When the image with visible light absorbance of 11% was visually checked, it was determined that the quality of the image was sufficient to be used as an invisible image. When the image with visible light absorbance of 13% was visually checked, it was determined that the quality of the image was not sufficient to be used as an invisible image.

<Evaluation of Reading Performance in Near-Infrared Region>

<Method of Measuring Absorbance of Light in Wavelength Range of 900 nm to 1800 nm>

On the sample image used for the invisibility evaluation, a spectrometry measurement was performed in a wavelength range of 900 nm to 1800 nm using an ultraviolet-visible-near-infrared spectrophotometer (trade name: MV-3300, manufactured by JASCO Corporation). A maximum absorbance in the measurement was set as the measured value of the sample image. A spectrometry measurement was also performed on a single sheet as a blank, and the value obtained by subtracting the measured value of the blank from the measured value of the sample image was set as the infrared absorbance (%). Table 3 illustrates the results. When the image with infrared absorbance of 3% was checked using the camera, it was determined that the quality of the image was sufficient to be read as an invisible image. However, when the image with infrared absorbance of 2% was checked using the camera, it was determined that the quality of the image was not sufficient to be read as an invisible image. It was also determined that the advantageous effect of the present disclosure was obtained for the image in which the ratio of the infrared absorbance (%) to the visible light absorbance (%) was 1.50 or more. Table 3 illustrates the results.

<Method of Measuring Light Transmittance in Wavelength Range of 400 nm to 800 nm>

A rectangular image of 1 cm×10 cm was formed on a PET film (trade name: Lumirror T60 (manufactured by Toray Industries, Inc.)) using the image forming apparatus with the loading amount of the toner 1 of 0.30 mg/cm$^2$, thereby obtaining a sample image.

On the above-described sample image, a spectrometry measurement was performed in a wavelength range of 400 nm to 800 nm using the photometer, and a maximum transmittance in the measurement was set as the measured value (%) of the sample image. The spectrometry measurement was also performed on a single PET film (PET film with no image formed thereon) as a blank. The value obtained by subtracting the measured value (%) of the blank from the measured value (%) of the sample image was set as the visible light transmittance (%). Table 3 illustrates the results.

Examples 2 to 20 and Comparative Examples 1 and 2

An evaluation was made in the same manner as in Example 1, except that the toner 1 and the toner 2 to 22 were changed as illustrated in Table 3. Table 3 illustrates the results.

TABLE 3

| | | Visible-light Absorbance | Infrared Absorbance | Infrared Absorbance (%)/Visible-light Absorbance (%) | Number of Thin Lines | Visible Light Transmittance |
|---|---|---|---|---|---|---|
| Example 1 | Toner 1 | 7% | 17% | 2.43 | 20 | 93% |
| Example 2 | Toner 2 | 7% | 21% | 3.00 | 20 | 93% |
| Example 3 | Toner 3 | 3% | 11% | 3.67 | 20 | 97% |
| Example 4 | Toner 4 | 4% | 16% | 4.00 | 20 | 96% |
| Example 5 | Toner 5 | 3% | 15% | 5.00 | 20 | 97% |
| Example 6 | Toner 6 | 5% | 20% | 4.00 | 20 | 95% |
| Example 7 | Toner 7 | 4% | 18% | 4.50 | 20 | 96% |
| Example 8 | Toner 8 | 3% | 17% | 5.67 | 20 | 97% |
| Example 9 | Toner 9 | 2% | 8% | 4.00 | 20 | 98% |
| Example 10 | Toner 10 | 2% | 7% | 3.50 | 20 | 98% |
| Example 11 | Toner 11 | 1% | 7% | 7.00 | 20 | 99% |
| Example 12 | Toner 12 | 8% | 32% | 4.00 | 20 | 92% |
| Example 13 | Toner 13 | 6% | 27% | 4.50 | 20 | 94% |
| Example 14 | Toner 14 | 6% | 17% | 2.83 | 20 | 94% |
| Example 15 | Toner 15 | 2% | 6% | 3.00 | 20 | 98% |
| Example 16 | Toner 16 | 1% | 3% | 3.00 | 20 | 99% |
| Example 17 | Toner 17 | 8% | 29% | 3.63 | 18 | 92% |
| Example 18 | Toner 18 | 11% | 40% | 3.64 | 14 | 89% |
| Example 19 | Toner 19 | 5% | 17% | 3.40 | 20 | 95% |
| Example 20 | Toner 20 | 5% | 20% | 4.00 | 20 | 95% |
| Comparative Example 1 | Toner 21 | 13% | 16% | 1.23 | 20 | 87% |
| Comparative Example 2 | Toner 22 | 3% | 2% | 0.67 | 20 | 97% |

The present invention is not limited to the above-described exemplary embodiments, and various alterations and modifications can be made without departing from the spirit and the scope of the present invention. Accordingly, the following claims are attached to publicize the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. Toner comprising toner particles, wherein the toner contains nanomaterials composed primarily of gold, among which nanomaterial having an aspect ratio of 1.5 or more is defined as gold nanorods, and wherein in a case where an aspect ratio distribution of the gold nanorods contained in the toner is measured, an average value u in the aspect ratio distribution is in a range of 6.0 to 13.0 and a standard deviation o in the aspect ratio distribution is in a range of 0.5 to 4.5.

2. The toner according to claim 1, wherein the standard deviation $\sigma$ is in a range of 0.5 to 2.5.

3. The toner according to claim 1, wherein the average value $\mu$ is in a range of 8.0 to 11.0 and the standard deviation $\sigma$ is in a range of 0.5 to 2.5.

4. The toner according to claim 1, wherein a weight-average particle diameter (D4) of the toner particles is 4.0 μm or more and to 9.0 μm or less.

5. The toner according to claim 1, wherein an average value of long-axis lengths of the gold nanorods contained in the toner is ¼ or less of a weight-average particle diameter (D4) of the toner particles.

6. The toner according to claim 1, wherein an average value of long-axis lengths of the gold nanorods contained in the toner is in a range of 50 to 110 nm.

7. The toner according to claim 1, wherein the toner further contains poly(3,4-ethylenedioxythiophene)-poly (styrenesulfonic acid) (PEDOT-PSS).

8. The toner according to claim 1, wherein in a spectroscopic analysis of a fixed image formed using the toner with a toner loading amount of 0.30 mg/cm$^2$, a maximum value of a light absorbance in a wavelength range of 400 nm or more to 800 nm or less is 10% or less.

9. The toner according to claim 1, wherein in a spectroscopic analysis of a fixed image formed using the toner with a toner loading amount of 0.30 $mg/cm^2$, a maximum value of a light absorbance in a wavelength range of 900 nm or more to 1800 nm or less is 5% or more.

10. The toner according to claim 1, wherein in a spectroscopic analysis of a fixed image formed using the toner with a toner loading amount of 0.30 $mg/cm^2$, a maximum value of a light transmittance in a wavelength range of 400 nm or more to 800 nm or less is 90% or more.

11. The toner according to claim 1, wherein the toner is toner for invisible image formation.

12. An image reading method comprising:

a step of reading an image formed with toner according to claim 1 using an apparatus equipped with a near-infrared sensor.

* * * * *